(12) United States Patent
Fiszer et al.

(10) Patent No.: US 11,887,477 B2
(45) Date of Patent: Jan. 30, 2024

(54) DEVICE, SYSTEM AND METHOD FOR CONTROLLING AUTONOMOUS VEHICLES USING A VISUAL NOTIFICATION DEVICE

(71) Applicant: MOTOROLA SOLUTIONS, INC., Chicago, IL (US)

(72) Inventors: Piotr Fiszer, Czestochowa (PL); Mateusz Smetek, Kwasniow Gorny (PL); Tomasz Wicherski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 299 days.

(21) Appl. No.: 17/258,125

(22) PCT Filed: Jul. 25, 2018

(86) PCT No.: PCT/PL2018/050036
§ 371 (c)(1),
(2) Date: Jan. 5, 2021

(87) PCT Pub. No.: WO2020/022912
PCT Pub. Date: Jan. 30, 2020

(65) Prior Publication Data
US 2021/0280059 A1   Sep. 9, 2021

(51) Int. Cl.
*G08G 1/00* (2006.01)
*G08G 1/0967* (2006.01)
(Continued)

(52) U.S. Cl.
CPC ..... *G08G 1/096708* (2013.01); *B60W 60/001* (2020.02); *G06V 20/56* (2022.01);
(Continued)

(58) Field of Classification Search
CPC .......... G08G 1/096708; G08G 1/0955; G08G 1/096741; G08G 1/096766;
(Continued)

(56) References Cited

U.S. PATENT DOCUMENTS 1,966,822 A * 7/1934 Lieb ....................... G08B 5/004
2/160
1,967,697 A * 7/1934 Williams ................. G08B 5/36
200/51.14
(Continued)

FOREIGN PATENT DOCUMENTS

CN  103903460 B  7/2016
CN  105893951 A  8/2016
(Continued)

OTHER PUBLICATIONS

International Search Report, dated Jul. 2, 2019, issued in corresponding PCT Application No. PCT/PL2018/050036, filed Jul. 25, 2018, Entitled: Device, System and Method for Controlling Autonomous Vehicles Using a Visual Notification Device.
(Continued)

*Primary Examiner* — Ian Jen
(74) *Attorney, Agent, or Firm* — PERRY + CURRIER, INC.

(57) ABSTRACT

A device, system and method for controlling autonomous vehicles using a visual notification device. A movement detector is used to detect a user gesture of a user. A controller in communication with the movement detector is used to control a visual notification device to provide a visual indication of the user gesture combined with authentication data stored at a memory, to visually instruct the autonomous vehicle to perform an action associated with the user gesture upon verification of the authentication data.

16 Claims, 8 Drawing Sheets

(51) Int. Cl.
*B60W 60/00* (2020.01)
*G08G 1/0955* (2006.01)
*G06V 20/56* (2022.01)
*G06V 40/20* (2022.01)

(52) U.S. Cl.
CPC ........... *G06V 40/20* (2022.01); *G08G 1/0955* (2013.01); *G08G 1/096741* (2013.01); *G08G 1/096766* (2013.01); *B60W 2420/42* (2013.01); *B60W 2556/45* (2020.02)

(58) Field of Classification Search
CPC .... G08G 1/096725; G08G 1/092; G08G 1/09; B60W 60/001; B60W 2420/42; B60W 2556/45; G06V 20/56; G06V 40/20; G06F 3/017
See application file for complete search history.

(56) References Cited

U.S. PATENT DOCUMENTS

| | | | | |
|---|---|---|---|---|
| 2,092,574 | A * | 9/1937 | Eddy | A41D 19/0157 116/35 R |
| 2,581,549 | A * | 1/1952 | McGaugh | G08B 5/004 116/28 R |
| 2,807,984 | A * | 10/1957 | Bailey | G08B 5/004 359/519 |
| 6,976,274 | B1 * | 12/2005 | Dufresne | A41D 19/01535 2/161.6 |
| 9,586,585 | B2 | 3/2017 | Delp et al. | |
| 2008/0187318 | A1 | 8/2008 | Osanai | |
| 2008/0218996 | A1 * | 9/2008 | Galloway | A41D 19/0157 315/291 |
| 2009/0226185 | A1 | 9/2009 | Karstens | |
| 2011/0157873 | A1 * | 6/2011 | English | F21L 4/00 362/103 |
| 2017/0262709 | A1 | 9/2017 | Wellington et al. | |
| 2017/0322761 | A1 | 11/2017 | Marcus et al. | |
| 2017/0341643 | A1 * | 11/2017 | Gutmann | G08G 1/09623 |
| 2018/0158328 | A1 * | 6/2018 | Benhammou | G08G 1/04 |

FOREIGN PATENT DOCUMENTS

| | | |
|---|---|---|
| DE | 102008042809 A1 | 4/2010 |
| DE | 102013207223 A1 | 10/2014 |
| DE | 102013220305 A1 | 4/2015 |
| DE | 102013220306 A1 | 4/2015 |
| DE | 102014111023 A1 | 2/2016 |
| DE | 102017002240 A1 | 11/2017 |
| WO | 2018050729 A1 | 3/2018 |

OTHER PUBLICATIONS

Kumar, Navin, "Visible Light Communication Based Traffic Information Broadcasting Systems", International Journal of Future Computer and Communication, vol. 3, No. 1, pp. 26-30, Feb. 2014, downloaded from https://pdfs.semanticscholar.org/eb6e/5392c1a872bbdfc4eeea0d18f09e682e6781.pdf.

Brown, Mike, Autonomous Cars are a Huge Problem for the Police_Inverse, published Jul. 5, 2017, downloaded from https://web.archive.org/web/20170705111059/https://www.inverse.com/article/33163-rodney-brooks-autonomous-cars-and-police.

Google's self-driving cars can now recognize hand signals from cyclists, published Jul. 6, 2016, downloaded from: https://www.fastcompany.com/4012862/googles-self-driving-cars-can-now-recognize-hand-signals-from-cyclists.

Binit_Che Wook, Haswani, et al., "Visible Light Communication with LED-based Traffic Lights Using 2-Dimensional Image Sensor", Published in: CCNC 2006. 2006 3rd IEEE Consumer Communications and Networking Conference, Jan. 8-10, 2006. https://ieeexplore.ieee.org/document/1593024.

* cited by examiner

DEVICE, SYSTEM AND METHOD FOR CONTROLLING AUTONOMOUS VEHICLES USING A VISUAL NOTIFICATION DEVICE

BACKGROUND OF THE INVENTION

Public safety officers often direct traffic manually, for example at intersections, during public safety incidents and/or when traffic lights are malfunctioning, and the like. Drivers of vehicles generally follow gestures performed by the persons directing traffic to stop and go, and the like. However, with autonomous vehicles becoming more ubiquitous, not all vehicles encountering a gesturing person directing may have a driver.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
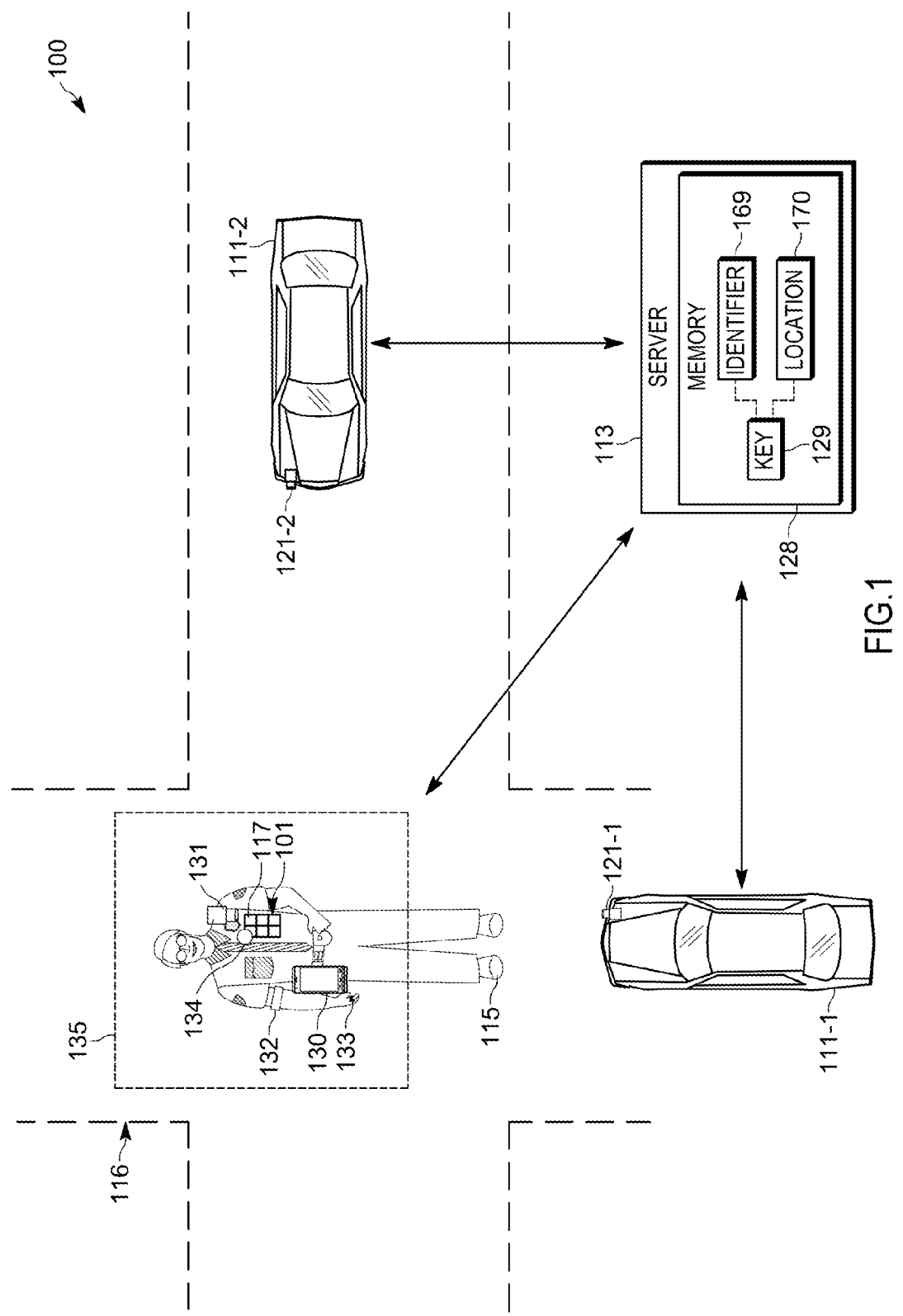
FIG. 1 depicts a system for controlling autonomous vehicles using a visual notification device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device for visually communicating with an autonomous vehicle, the device comprising: a visual notification device; a memory storing authentication data; and a controller in communication with a movement detector, the controller communicatively coupled to the visual notification device and the memory, the controller configured to: detect, using the movement detector, a user gesture of a user; and control the visual notification device to provide a visual indication of the user gesture combined with the authentication data to visually instruct the autonomous vehicle to perform an action associated with the user gesture upon verification of the authentication data.

Another aspect of the specification provides a method for visually communicating with an autonomous vehicle, the method comprising: detecting, using a movement detector, a user gesture of a user; and controlling, using a controller in communication with the movement detector, a visual notification device to provide a visual indication of the user gesture combined with authentication data stored at a memory, to visually instruct the autonomous vehicle to perform an action associated with the user gesture upon verification of the authentication data.

Another aspect of the specification provides a system comprising: an autonomous vehicle comprising a camera; and a device for visually communicating with the autonomous vehicle, the device comprising: a visual notification device; a memory storing authentication data; and a controller in communication with a movement detector, the controller communicatively coupled to the visual notification device and the memory, the controller configured to: detect, using the movement detector, a user gesture of a user; and control the visual notification device to provide a visual indication of the user gesture combined with the authentication data to visually instruct the autonomous vehicle to perform an action associated with the user gesture upon verification of the authentication data, the autonomous vehicle configured to: detect, using the camera, the visual indication of the user gesture combined with the authentication data; verify the visual indication of the user gesture; and perform the action associated with the user gesture upon verification of the authentication data.

Attention is directed to FIG. 1, which depicts an example system 100 for controlling autonomous vehicles using a visual notification device. The system 100 comprises a device 101 for visually communicating with an autonomous vehicle, one or more autonomous vehicles 111-1, 111-2 and a server 113. The one or more autonomous vehicles 111-1, 111-2 are interchangeably referred to hereafter, collectively, as the autonomous vehicles 111 and, generically as an autonomous vehicle 111. Furthermore, while only two autonomous vehicles 111 are depicted, the system 100 may include more than two autonomous vehicles 111. Furthermore, the system 100 may include non-autonomous vehicles.

As depicted, the device 101 is being worn by a user 115. The user 115 is generally directing traffic and may be a traffic director, traffic controller or traffic conductor, and the like. Hence, while as depicted the user 115 is a police officer, the user 115 may be anyone directing traffic. For example, the user 115 is performing user gestures to direct traffic in an intersection 116, as described in more detail below. Such user gestures may include, but are not limited, hand and arm gestures of the user 115 to instruct an autonomous vehicle to stop, go, pull over, and the like. For example, the user 115 may hold out a hand in a stop motion to gesture to one of the autonomous vehicles 111 to stop, wave one of the autonomous vehicles 111 through the intersection 116. Indeed, any suitable user gesture for directing traffic, and the like, is within the scope of present implementations.

As depicted, the system 100 includes two autonomous vehicles 111 at the intersection 116, however the system 100 may include as few as one autonomous vehicle 111; however, the system 100 may include an autonomous vehicle 111 at each entrance to the intersection 116 (e.g. as depicted, four entrances and hence four autonomous vehicles), as well as autonomous vehicles approaching the intersection, for example behind one or more of the autonomous vehicles 111.

As depicted, each of the autonomous vehicles 111 are travelling in different directions (e.g. as depicted, the autonomous vehicles 111 are travelling in directions that are about 90° to each other, though the autonomous vehicles 111 may be travelling in directions that are about 180° to each other and/or any other directions defined by the boundaries of the intersection). As further depicted, the user 115 is facing a first autonomous vehicle 111-1 and is not facing a second autonomous vehicle 111-2.

Each of the autonomous vehicles 111 may include, but are not limited to, a driverless vehicle, a self-driving vehicle, robotic vehicle, and the like. Each of the autonomous vehicles 111 are generally configured to sensing a surrounding environment and navigate without human input. For example, each of the autonomous vehicles 111 are generally configured to operate autonomously, for example to navigate, steer, brake, and the like without the intervention and/or control of a human driver, though the autonomous vehicles 111 may carry one or more occupants. However, as there is no human driver controlling the autonomous vehicles 111, user gestures of the user 115 may not be followed by the autonomous vehicles 111.

Hence, the device 101 worn by the user 115 generally comprises a visual notification device 117 that provides a visual indication of a user gesture, performed by the user 115, combined with authentication data that may be used to verify the visual indication. Such authentication data may be stored by a memory of the device 101 and may comprise a key, a security key, a cryptographic key, a symmetric cryptographic key, an asymmetric cryptographic key, a private cryptographic key, data for retrieving a key and/or a cryptographic key from a repository, a first private key associated with the user 115; and a second private key associated with an entity of the user 115.

Such keys may be used to validate and/or authorize and/or sign data representing an unvalidated version of the visual indication and/or unauthorized version of the visual indication and/or unsigned version of the visual indication to produce a validated version of the visual indication and/or an authorized version of the visual indication and/or a signed version. The visual indication is generated from the data representing an unvalidated version of the visual indication and validated and/or authorized and/or signed using the key. The data representing an unvalidated version of the visual indication may be stored at a memory of the device 101.

As will be described in further detail below, the visual indication of the user gesture, combined with the authentication data, provided by the visual notification device 117, may comprise one or more of: one or more flashing colors; one or more colored visual indications (including, but not limited to, black and white visual indications); one or more red-green-blue visual indications (though other colors may be used); and the like. Hence, the visual notification device 117 may comprise one or more of a display screen; a color display screen; one or more light emitting diodes; a light emitting diode array; and the like. Furthermore, as depicted, the device 101 is being worn by the user 115 such that a front of the visual notification device 117 is facing away from a front of the user 115.

In some examples, prior to providing the visual indication of the user gesture, combined with the authentication data, the device 101 may: determine a direction of the user gesture; and control the visual notification device 117 to provide the visual indication of the user gesture combined with the authentication data when the direction of the user gesture is one or more of: towards an autonomous vehicle 111; and in a same direction as a front of the visual notification device 117.

In general, each of the autonomous vehicles 111 comprises a respective camera 121-1, 121-2 pointing in a forward-facing direction (e.g. a direction of travel), which may be used to detect the visual indication of the user gesture combined with the authentication data. The cameras 121-1, 121-2 are interchangeably referred to hereafter, collectively, as the cameras 121 and, generically as a camera 121. While the cameras 121 are depicted as mounted on a respective hood of a respective autonomous vehicle 111, the camera 121 may be in any suitable position. Furthermore, one or more of the autonomous vehicles 111 may include two or more cameras that may be used detect the visual indication of the user gesture combined with the authentication data.

Prior to performing an action associated with the user gesture (e.g. such as stopping or moving through the intersection), an autonomous vehicle 111 verifies the visual indication of the user gesture.

For example, the server 113 generally comprises a repository and/or a memory 128 storing a key 129 associated with the device 101 and/or the user 115. As depicted, the key 129 may be stored in association with an identifier 169 of the user 115, such as a badge number and the like, as indicated by a dotted line therebetween. However, the identifier 169 may be any identifier that identifies the user 115 directing traffic and the like, however any type of identifier is within the scope of the present specification. Alternatively, the key 129 may be stored in association with a location 170 of the user 115. Alternatively, the key 129 may be stored without the identifier 169 and/or the location 170. Alternatively, the identifier 169 may comprise an identifier associated with all users associated with an entity that may be deploying users to direct traffic, such as a traffic department, a police department and the like.

The key 129 may be the same symmetric cryptographic key stored by the device 101 and/or an asymmetric cryptographic key complementary to an asymmetric cryptographic key stored by the device 101 and/or a public cryptographic key complementary to a private cryptographic key stored by the device 101. However, the key 129 may be any authentication data for authenticating the visual indication provided by the visual notification device 117.

Furthermore, at least the autonomous vehicles 111 are in communication with the server 113 via respective wireless communication links depicted in system 100 as arrows between the autonomous vehicles 111 and the server 113. Each of the wireless communication links may be via one or more wireless communication networks, which may include, but are not limited to: A digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network.

Hence, an autonomous vehicle 111 may receive and/or retrieve the key 129 from the memory 128, for example via a respective wireless communication link, and decode and/or authenticate and/or validate and/or decrypt the visual indication provided by the visual notification device 117, using the key 129, to determine the unvalidated version of the visual indication, the visual indication provided by the visual notification device 117 having been validated and/or authorized and/or signed and/or encrypted using an associated key at the device 101. Once an autonomous vehicle 111 has verified and/or validated and/or authenticated and/or decrypted the visual indication, for example by comparing the unvalidated version of the visual indication with a plurality of unvalidated versions of visual indications (e.g. stored at a memory of an autonomous vehicle 111) to determine whether a match occurs, an autonomous vehicle 111 may perform an action indicated by the user gesture.

Hence, the device 101 may translate and/or convert a user gesture to an unvalidated and/or unauthorized and/or unsigned visual notification, validate and/or authorize and/or sign the unvalidated visual notification to produce a validated visual notification using authentication data; and, when the user gesture is in a direction of an autonomous vehicle (e.g. the autonomous vehicle 111), the device 101 may control the visual notification device 117 to provide the validated visual notification, for example as a series of flashing lights and/or colors and/or as a pattern, and the like.

An autonomous vehicle 111 may detect the validated visual notification provided by the visual notification device 117 using a respective camera 121, decode and/or validate and/or authenticate and/or decrypt the validated visual notification, using the key 129 received and/or retrieved from the memory 128, to decode and/or validate and/or authenticate and/or decrypt the validated visual notification, to determine the unvalidated visual notification. When verification occurs, the autonomous vehicle 111 may perform an action associated with the user gesture, for example, to stop at the intersection 116, and the like. In this manner, the device 101 securely communicates the user gesture to the autonomous vehicle 111 in a directional manner.

In general, the device 101 may include and/or be in communication with, a movement detector to detect the user gesture and/or a direction of the user gesture. Hence, as depicted, the user 115 is further wearing a communication device 130 and one or more movement detectors including, but not limited to, a camera 131 (e.g. mounted on a shoulder of the user 115, and which may be integrated into a remote speaker microphone, and the like), an armband 132 and a ring 133 (e.g. wearable device wearable by the user 115). Furthermore, as depicted, the device 101 may comprise an integrated movement detector such as a camera 134 integrated with the device 101. While not depicted, the communication device 130 may also include a movement detector, such as a camera, and/or devices similar to the armband 132 and/or the ring 133, and the like. Indeed, any type of movement detector for detecting a user gesture and/or a direction of the user gesture is within the scope of the present specification.

The devices worn by the user, including the device 101, the communication device 130, the camera 131, the armband 132 and the ring 133 may be in wireless communication with each other and form a personal area network (PAN) 135. For example, the communication device 130 may act as a hub of the PAN 135. The PAN 135 may include other devices not shown, including but not limited to, smart glasses worn by the user 115, a laptop computer, a remote-speaker microphone, and the like. The PAN 135 may also be in communication with the server 113 via a respective wireless communication link (depicted as an arrow between the PAN 135 and the server 113). For example, when one of the devices of the PAN 135 (such as the communication device 130) include a Global Positioning System (GPS) device, a GLONASS (Globalnaya navigatsionnaya sputnikovaya sistema) device, a Galileo device, and the like, the PAN 135 may communicate the location 170 of the user 115 to the server 113. However, the device 101, the communication device 130, the camera 131, the armband 132 and the ring 133 may alternatively be in wireless communication with each other without forming a PAN Each of the movement detectors is generally configured to assist the device 101 with detecting a user gesture of the user 115. For example, each of the cameras 131, 134 is generally facing away from a front of the user 115 performing the user gesture, and hence may detect video and/or images that include the user gesture, and an application of the device 101 may use machine learning algorithms, and the like, to determine a user gesture from the video and/or images.

The armband 132 and/or the ring 133 may comprise one or more accelerometers, magnetometers, gyroscopes, and the like which generate data indicative of a user gesture, which is transmitted to the device 101, for example via the PAN 135. An application of the device 101 may use machine learning algorithms, and the like, to determine a user gesture from the data from the armband 132 and/or the ring 133. Furthermore, while the user 115 is depicted as wearing only one armband 132 and/or the ring 133, the user 115 may wear more than one armband 132 and/or more than one ring 133, for example on different arms and/or fingers, and/or the user 115 may wear one or more leg bands, similar to the armband 132, on one or more legs.

Figure 2:
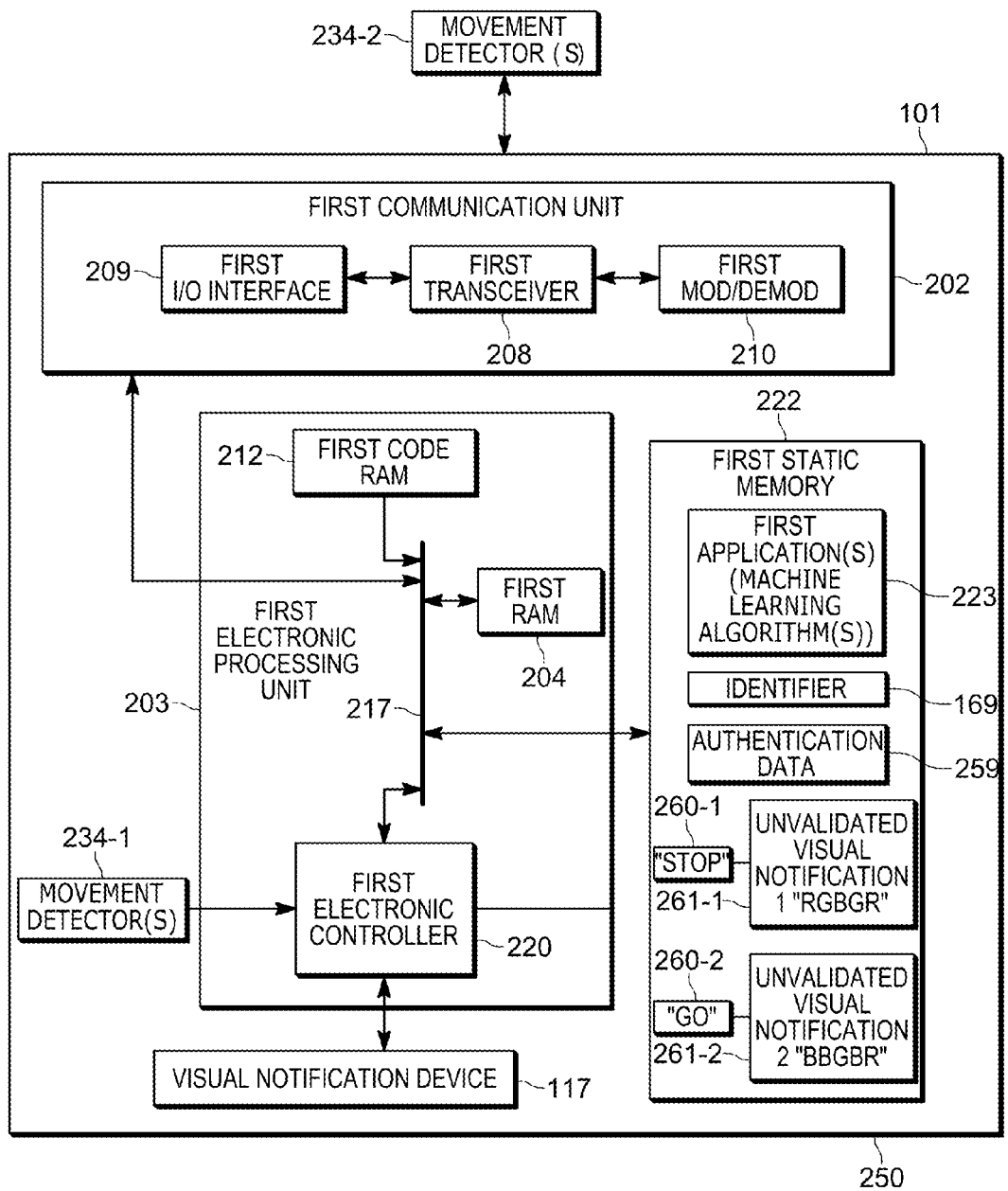
FIG. 2 depicts an example device for visually communicating with an autonomous vehicle in according with some embodiments.

Indeed, any suitable type of movement detector and/or sensor for detecting and/or identifying a user gesture and/or a direction of a user gesture is within the scope of the present specification, including movement detector and/or sensors that are not armbands, rings, leg bands or cameras. sensor that can identify a gesture can be used not just an armband and a ring Attention is next directed to FIG. 2 which sets forth a schematic diagram that illustrates an example of the device 101. As depicted in FIG. 2, the example device 101 generally includes the visual notification device 117, a first communications unit 202, a first electronic processing unit 203, a first non-transitory Random Access Memory (RAM) 204, one or more first wireless transceivers 208, one or more first wired and/or wireless input/output (I/O) interfaces 209, a combined first modulator/demodulator 210, a first non-transitory code Read Only Memory (ROM) 212, a common data and address bus 217, a first electronic controller 220, and a first non-transitory static memory 222 storing one or more first applications 223 (which may include one or more machine learning algorithms).

As depicted, the device 101 further comprises at least one integrated movement detector 234-1, such as the camera 134 and/or the device 101 may be in communication with at least one external movement detector 234-2, such as one or more of the camera 131, the armband 132, the ring 133 and/or a movement detector at the communication device 130. The movement detectors 234-1, 234-2 are interchangeably referred to hereafter, collectively, as the movement detectors 234 and, generically, as a movement detector 234. Regardless, the electronic controller 220 is generally in communication with a movement detector which may be integrated with the device 101 and/or external to the device 101.

In some examples, the device 101 further comprises a housing, such as a wearable housing wearable by the user 115, and the like. However, the device 101 may alternatively be integrated with another device of the PAN 135, such as the communication device 130, the camera 134, a remote speaker microphone, and the like, and/or apparel of the user 115, such a shirt, and the like, with a housing of the device 101 adapted accordingly.

The one or more applications 223 will be interchangeably referred to hereafter as the application 223, though different applications 223 may be used for different modes of the device 101.

Furthermore, while not depicted, the device 101 may include other components such as one or more input devices, speakers, microphones, and the like.

The electronic processing unit 203 may include the non-transitory code Read Only Memory (ROM) 212 coupled to the common data and address bus 217 for storing data for initializing system components. The electronic processing unit 203 may further include the electronic controller 220 coupled, by the common data and address bus 217, to the non-transitory Random-Access Memory (RAM) 204 and a static memory 222.

The communications unit 202 may include one or more wired and/or wireless input/output (I/O) interfaces 209 that are configurable to communicate with other devices, such as the communication device 130 and/or the external one movement detector 234-2 and/or the server 113.

For example, the communications unit 202 may include one or more wireless transceivers 208, such as a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE (Long-Term Evolution) transceiver and/or other types of GSM (Global System for Mobile communications) transceivers, a Worldwide Interoperability for Microwave Access (WiMAX) transceiver, for example operating in accordance with an IEEE 802.16 standard, and/or another similar type of wireless transceiver configurable to communicate via a wireless radio network.

The electronic controller 220 may include ports (e.g. hardware ports) for coupling to the visual notification device 117 and the integrated movement detector 234-1.

The electronic controller 220 includes one or more logic circuits, one or more processors, one or more microprocessors, one or more ASIC (application-specific integrated circuits) and one or more FPGA (field-programmable gate arrays), a system on a hardware computer chip, and/or another electronic device. In some examples, the electronic controller 220 and/or the device 101 is not a generic controller and/or a generic device, but a device specifically configured to implement functionality for visually communicating with an autonomous vehicle. For example, in some examples, the device 101 and/or the electronic controller 220 specifically comprises a computer executable engine configured to implement specific functionality for visually communicating with an autonomous vehicle.

The static memory 222 is a machine readable medium and/or non-transitory memory that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the electronic controller 220 which makes appropriate utilization of volatile storage during the execution of such programming instructions.

As depicted, the memory 222 further stores authentication data 259 which may include, but is not limited to, a key, a security key, a cryptographic key, data for retrieving a key from a repository (e.g. the memory 128); a first private key associated with the user 115; and a second private key associated with an entity of the user 115. For example, the authentication data 259 may comprise a private key and/or private cryptographic key associated specifically with the user 115, or the authentication data 259 may comprise a private key and/or private cryptographic key associated all users directing traffic. The authentication data 259 may further comprise the identifier 169 which may be used to retrieve the key 129 from the memory 128.

As depicted, the memory 222 further stores a plurality of gesture data 260-1, 260-2 (interchangeably referred to hereafter as gesture data 260) which include data corresponding to a user gesture as generated by one or more of the movement detectors 234. For example, the gesture data 260-1 may comprise data which may be used to identify that the user 115 is performing a "Stop" gesture (e.g. to instruct an autonomous vehicle 111 to stop) in video and/or images of the user 115 and/or according to data generated by the armband 132, the ring 133, and the like. Similarly, the gesture data 260-1 may comprise data which may be used to identify that the user 115 is performing a "Go" gesture ((e.g. to instruct an autonomous vehicle 111 to go) in video and/or images of the user 115 and/or according to data generated by the armband 132, the ring 133, and the like. While two sets of gesture data 260 are depicted, for example for two different user gestures, the memory 222 may store any number of sets of gesture data 260 indicative of any number of user gestures including but not limited to, an autonomous vehicle 111 being instructed to pull over, and the like.

The memory 222 further stores a plurality of unvalidated visual notification data 261-1, 261-2 (interchangeably referred to hereafter as unvalidated visual notification data 261), each set of gesture data 260 stored in association with a respective set of unvalidated visual notification data 261, as indicated by a dotted line therebetween. Each set of unvalidated visual notification data 261 comprises data indicative of a respective pattern, and the like, that may be provided by the visual notification device 117 to indicate a user gesture as indicated by an associated set of gesture data 260. The unvalidated visual notification data 261 may be used by the controller to generate respective control instructions for controlling the visual notification device 117 to provide a respective visual notification of an associated user gesture.

For example, the unvalidated visual notification data 261-1 is associated with the "Stop" gesture data 260-1 may comprise data indicative of a pattern for controlling the visual notification device 117 to provide a visual notification of the "Stop" gesture, such as particular pattern of flashing lights and/or colored lights. For example, as depicted the unvalidated visual notification data 261-1 comprises alphanumeric text "RGBGR" indicating that the visual notification device 117 may be controlled to provide a pattern of colors in a sequence "Red-Green-Blue-Green-Red" to indicate a "Stop" user gesture.

Similarly, the unvalidated visual notification data 261-2 associated with the "Go" gesture data 260-2 may comprise data indicative of a pattern for controlling the visual notification device 117 to provide a visual notification of the "Go" gesture, such as particular pattern of flashing lights and/or colored lights. For example, as depicted the unvalidated visual notification data 261-2 comprises alphanumeric text "BBGBR" indicating that the visual notification device 117 may be controlled to provide a pattern of colors in a sequence "Blue-Blue-Green-Blue-Red" to indicate a "Go" user gesture.

However, the unvalidated visual notification data 261 may also be stored numerically, for example as numbers that represent colors. In some examples, the unvalidated visual notification data 261 may be stored as bit values, and the like, which may be represent a color sequence and/or color pattern and the like; for example, "0" may represent white, "1" may represent black, and the like; in other words, the colors in the sequence may include black and white. Similarly, in other examples the unvalidated visual notification data 261 may be stored as hexadecimal values; for example, "0x8" may represent blue, "0xf(16)" may represent red, etc. However, any numbering scheme that represents color is within the scope of the present specification.

The patterns of the unvalidated visual notification data 261 for the different user gestures are generally different from each other. While the patterns of the unvalidated visual notification data 261 are depicted as sequences of colors, such patterns may be provided at the same time, for example with different colors in different regions of the visual notification device 117. Indeed, any type of pattern that may be provided by the visual notification device 117 is within the scope of the present specification.

As depicted, the memory 222 may further store the identifier 169 associated with the user 115. Furthermore, the electronic controller 220 may be configured to convert the identifier 169 to a visual notification and/or a respective visual indication of the authentication data 259 which may be used by an autonomous vehicle 111 to retrieve the key 129 from the memory 128. Alternatively, the electronic controller 220 may be configured to convert the authentication data 259 to a visual notification and/or a respective visual indication of the authentication data 259.

The memory 222 further stores instructions corresponding to the application 223 that, when executed by the electronic controller 220, enables the electronic controller 220 to implement functionality for visually communicating with an autonomous vehicle. In illustrated examples, when the electronic controller 220 executes the application 223, the electronic controller 220 is enabled to: detect, using a movement detector 234, a user gesture of a user; and control the visual notification device 117 to provide a visual indication of the user gesture combined with the authentication data to visually instruct the autonomous vehicle to perform an action associated with the user gesture upon verification of the authentication data.

The application 223 may include one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of the present specification.

Indeed, the example device 101 may initially be operated in a learning mode to "teach" the machine learning algorithm(s) of the example device 101 to detect, using data from the movement detector 234, a user gesture of a user and/or a direction of the user gesture; later, feedback from searching may be provided to the machine learning algorithm(s) of the example device 101 to improve detection, using data from the movement detector 234, of a user gesture of a user and/or a direction of the user gesture. In this manner, the machine learning algorithm(s) of the example device 101 are taught over time, for example using historical data, to determine successful outputs from given inputs.

Furthermore, different applications 223 may correspond to different machine learning algorithms, and/or different modes of the device 101. For example, different combinations of one or more different machine learning algorithms may be executed depending on a preconfigured and/or selected mode of the device 101.

However, while the device 101 is described with respect to including certain components, it is understood that functionality of the device 101 may be partially distributed among other components which may include components of the PAN 135. For example, the communications unit 202 may be configured to communicate with devices being word by the user 115, which may (or may not) include devices of the PAN 135, including the communication device 130, and the communication device 130 (which may act as the hub of the PAN 135) may perform communications between the device 101 and the server 113, and/or the communication device 130 may perform communications between the device 101 and the at least one external movement detector 234-2.

Furthermore, the device 101 may be distributed among a plurality of devices of the system 100 (and/or, when present, the PAN 135); for example, a portion of the functionality of the device 101 may be implemented at one or more cloud-based devices (which may include, but is not limited to, the server 113) in communication with the devices worn by the user 115, for example to take advantage of faster processing speeds of such devices.

While not depicted, the device 101 may further comprise a location determining device, such as a Global Positioning System device, and the like and/or another device worn by the user (which may include a device of the PAN 135, when present) may include such a location determining device; either way, the device 101 and/or another device may report the location of the user 115 to the server 113, for example periodically.

Figure 3:
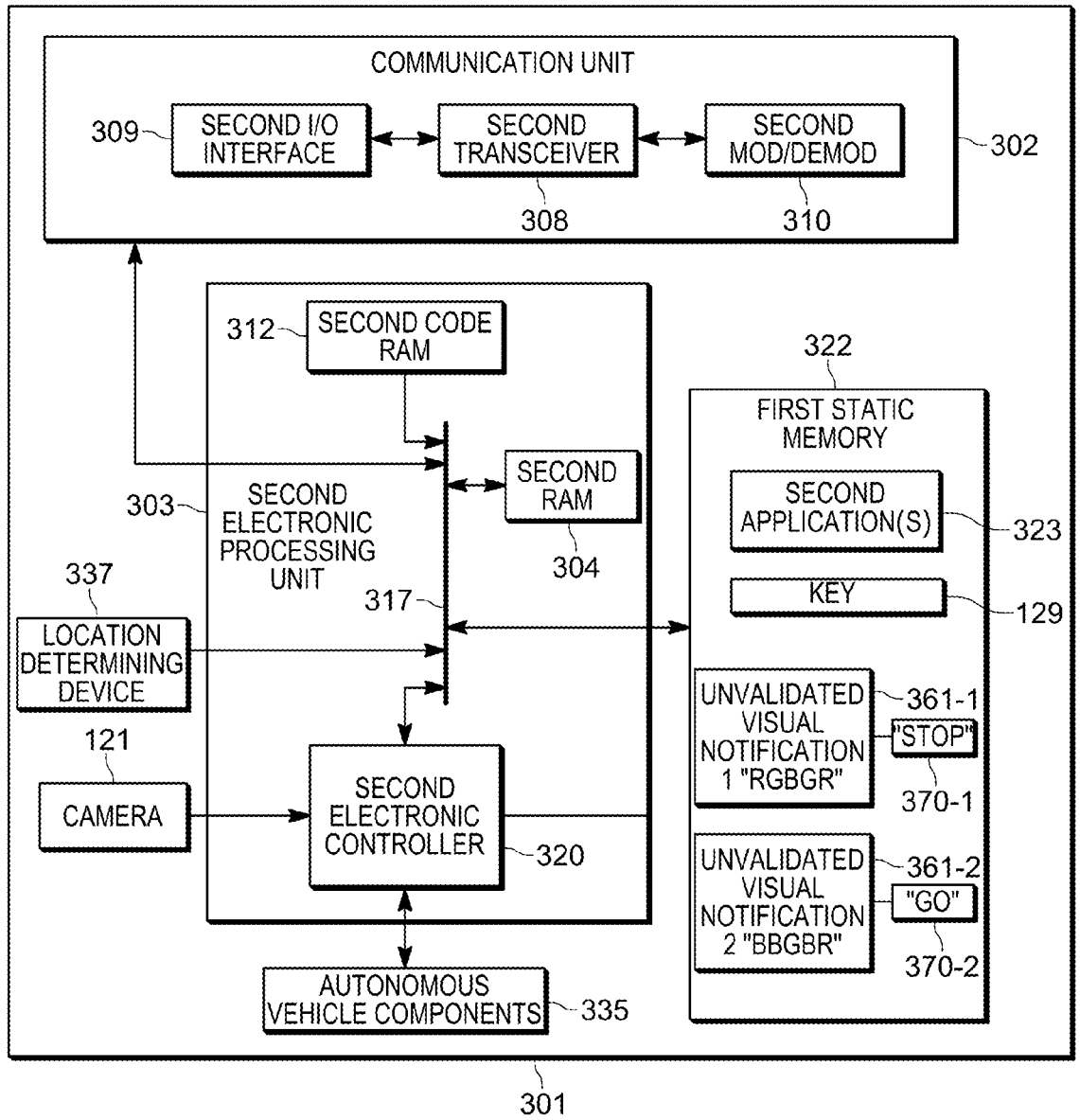
FIG. 3 depicts an example autonomous vehicle computing device for receiving visual signals from a visual notification device in according with some embodiments

Attention is next directed to FIG. 3 which sets forth a schematic diagram that illustrates an example computing device 301 of an autonomous vehicle 111. As depicted in FIG. 3, the computing device 301 generally includes a camera 121, a second communications unit 302, a second electronic processing unit 303, a second non-transitory Random Access Memory (RAM) 304, one or more second wireless transceivers 308, one or more second wired and/or wireless input/output (I/O) interfaces 309, a combined second modulator/demodulator 310, a second non-transitory code Read Only Memory (ROM) 312, a common data and address bus 317, a second electronic controller 320, and a second static memory 322 storing one or more second applications 323 (which may include one or more machine learning algorithms). As depicted, the computing device 301 further comprises one or more autonomous vehicle components 335 and a location determining device 337 (such as a Global Positioning System device and the like).

The one or more applications 323 will be interchangeably referred to hereafter as the application 323, though different applications 323 may be used for different modes of the computing device 301.

Furthermore, while not depicted, the computing device 301 may include other devices such as one or more input devices, speakers, microphones, display screens and the like.

The camera 121 may comprise any suitable camera device, video device and the like for acquiring images of a visual notification device, such as the visual notification device 117.

The autonomous vehicle components 335 may include, but are not limited to, sensors (e.g. radar sensors, image capturing devices (e.g. cameras, still image cameras, video cameras and the like), light detection and ranging (LIDAR) sensors, and the like), steering controllers, engine controllers, braking controllers, navigation devices (which may include the location determining device 337), and the like, for implementing self-driving and/or autonomous vehicle functionality including, but not limited to, actions indicated by the visual notification device 117.

The electronic processing unit 203 may include the non-transitory code Read Only Memory (ROM) 312 coupled to the common data and address bus 317 for storing data for initializing system components. The electronic processing unit 203 may further include the electronic controller 320 coupled, by the common data and address bus 317, to the non-transitory Random-Access Memory (RAM) 304 and a non-transitory static memory 322.

The communications unit 302 may include one or more wired and/or wireless input/output (I/O) interfaces 309 that are configurable to communicate with other devices, such as the server 113.

For example, the communications unit 302 may include one or more wireless transceivers 308, such as a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE transceiver and/or other types of GSM transceivers, a Worldwide Interoperability for Microwave Access (WiMAX) transceiver, for example operating in accordance with an IEEE 802.16 standard, and/or another similar type of wireless transceiver configurable to communicate via a wireless radio network.

The electronic controller 320 may include ports (e.g. hardware ports) for coupling to the autonomous vehicle components 335, the camera 121 and the location determining device 337.

The electronic controller 320 includes one or more logic circuits, one or more processors, one or more microprocessors, one or more ASIC (application-specific integrated circuits) and one or more FPGA (field-programmable gate arrays), and/or another electronic device. In some examples, the electronic controller 320 and/or the computing device 301 is not a generic controller and/or a generic device, but a device specifically configured to implement functionality for receiving visual signals from a visual notification device. For example, in some examples, the computing device 301 and/or the electronic controller 320 specifically comprises a computer executable engine configured to implement specific functionality for receiving visual signals from a visual notification device.

The static memory 322 is a machine readable medium and/or non-transitory memory that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the computing device 301 as described herein are maintained, persistently, at the memory 322 and used by the electronic controller 320 which makes appropriate utilization of volatile storage during the execution of such programming instructions.

As depicted, the memory 322 further stores the key 129, which may be received and/or retrieved from the server 113 based on a location of an autonomous vehicle 111 of the computing device 301 and/or based on a respective visual indication of the authentication data 259 received with a visual indication of a user gesture (e.g. a visual indication of the identifier 169 and/or the authentication data 259). However, prior to being received and/or retrieved from the server 113, the key 129 may not be initially stored at the memory 322.

The memory 322 further stores the plurality of unvalidated visual notification data 361-1, 361-2 (interchangeably referred to hereafter as unvalidated visual notification data 361) corresponding to the unvalidated visual notification data 261. Hence, the unvalidated visual notification data 361 comprise data corresponding to an unsigned visual indication of the visual notification device 117, for example data indicative of a respective pattern of flashing lights and/or colors indicative of a respective user gesture. For example, each set of unvalidated visual notification data 361-1, 361-2 may be respectively similar to and/or the same as unvalidated visual notification data 261-1, 261-2.

Furthermore, the memory 322 further stores a plurality of action data 370-1, 370-2 (interchangeably referred to hereafter as action data 370) stored in association with respective unvalidated visual notification data 361. Each set of action data 370 include instructions for controlling the autonomous vehicle components 335 to perform a respective action. For example, the action data 370-1 may comprise instructions which may be used to control the autonomous vehicle components 335 to "Stop", when the computing device 301 determines that a visual notification has been received from the visual notification device 117 corresponding to the unvalidated visual notification data 361-1. Similarly, the action data 370-2 may comprise instructions which may be used to control the autonomous vehicle components 335 to "Go", when the computing device 301 determines that a visual notification has been received from the visual notification device 117 corresponding to the unvalidated visual notification data 361-2.

The memory 322 further stores instructions corresponding to the application 323 that, when executed by the electronic controller 320, enables the electronic controller 320 to implement functionality for receiving visual signals from a visual notification device. In illustrated examples, when the electronic controller 320 executes the application 323, the electronic controller 320 is enabled to: detect, using the camera 121, a visual indication of the user gesture combined with authentication data (e.g. as provided by the visual notification device 117); verify and/or validate and/or authenticate the visual indication of the user gesture; and perform an action associated with the user gesture upon verification of the authentication data.

The application 323 may include one or more machine learning algorithms similar to those described above, for example for detection, using the camera 121, a visual indication of the user gesture combined with authentication data, and which may be taught to recognize visual indications in teaching mode and/or using feedback.

Functionality of the computing device 301 may be distributed among a plurality of devices of the system 100; for example, a portion of the functionality of the computing device 301 may be implemented at one or more cloud-based devices (which may include, but is not limited to, the server 113), for example to take advantage of faster processing speeds of such devices.

Figure 4:
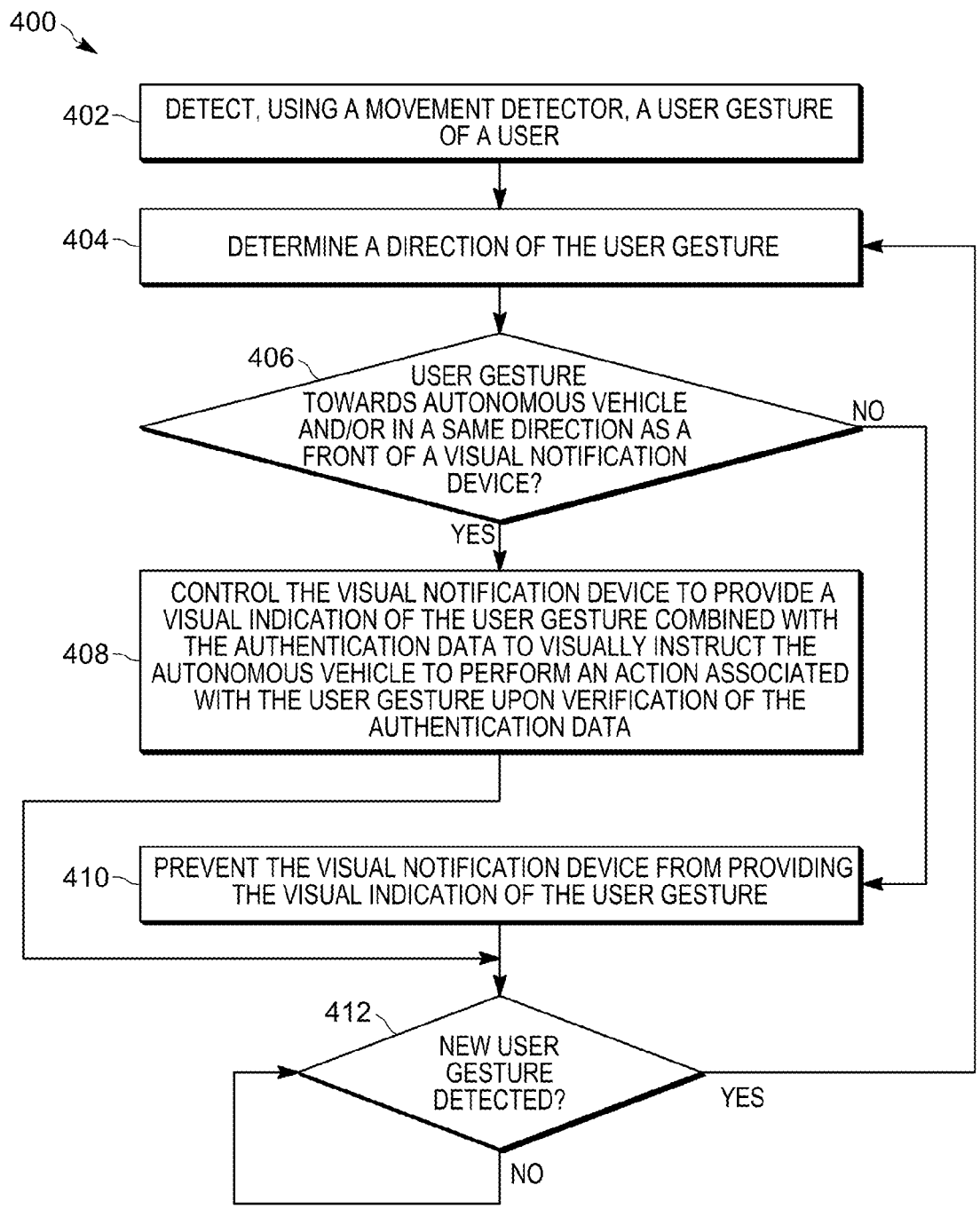
FIG. 4 depicts a flowchart of a method for controlling autonomous vehicles using a visual notification device, in accordance with some embodiments.

Attention is now directed to FIG. 4 which depicts a flowchart representative of a method 400 for controlling autonomous vehicles using a visual notification device. The operations of the method 400 of FIG. 4 correspond to machine readable instructions that are executed by, for example, the device 101, and specifically by the electronic controller 220 of the device 101. In the illustrated example, the instructions represented by the blocks of FIG. 4 are stored at the memory 222 for example, as the application 223. The method 400 of FIG. 4 is one way in which the electronic controller 220 and/or the device 101 and/or the system 100 is configured. Furthermore, the following discussion of the method 400 of FIG. 4 will lead to a further understanding of the device 101 and/or the system 100, and its various components. However, it is to be understood that the method 400 and/or the device 101 and/or the system 100 may be varied, and need not work exactly as discussed herein in conjunction with each other, and that such variations are within the scope of present examples.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the device 101 and/or the system 100 of FIG. 1, as well.

Furthermore, while it is understood by a person of skill in the art hereafter that the method 400 is performed at the device 101, the method 400 may be performed at one or more of the devices of the system 100, for example at a combination of the device 101 and/or other devices worn by the user 115, and/or and a cloud-computing device, such as the server 113.

At a block 402, the electronic controller 220 detects, using a movement detector 234, a user gesture of a user (e.g. the user 115).

At a block 404, the electronic controller 220 determines a direction of the user gesture.

For example, data from a movement detector 234 may be compared to the gesture data 260 to determine whether the data corresponds to a user gesture data and/or a direction of the user gesture. As the user 115 may be moving their hands and arms often and/or constantly, not all movement corresponds to a user gestures of the gesture data; hence data from a movement detector 234 that does not correspond to gesture data 260 may be discarded. Alternatively, machine learning algorithms of the device 101 may be "taught" to recognize user gestures, and directions thereof, in data from a movement detector 234.

When the electronic controller 220 compares data from a movement detector 234 with the gesture data 260, and a match occurs, and/or a machine learning algorithm determines that a given user gesture has occurred, corresponding unvalidated visual notification data 261 may be determined.

At block 406, the electronic controller 220 determines whether a direction of the user gesture is one or more of in a first direction towards one of the plurality of autonomous vehicles 111 and/or in a same direction as a front of the visual notification device 117, or a second direction that excludes any of the plurality of plurality of autonomous vehicles 111 and/or is not in a same direction as a front of the visual notification device 117. Such a determination may occur using the gesture data 260 and/or data from one or more of the camera 131, 134; for example, images from one or more of the cameras 131, 134 may indicate a direction of the user gesture and whether the user gesture is in a direction of an autonomous vehicles 111 and/or in a same direction as a front of the visual notification device 117. Similarly, data from the armband 132 and/or the ring 133 may be used to determine whether the user gesture is in a same direction as the front of the visual notification device 117.

Alternatively, the combination of the blocks 402, 404 may include a detection of two user gestures, wherein one of the two user gestures is indicative of an action to be taken by one of the autonomous vehicles 111, and a second of the two user gestures is indicative of which of the autonomous vehicles 111 is to implement the action. For example, the user 115 may first point at the autonomous vehicle 111-1 (e.g. a first user gesture indicating that the autonomous vehicle 111-1 is to perform a next user gesture) and then the user 115 may perform a user gesture indicative of an action to be taken by the autonomous vehicle 111-1 (e.g. a second user gesture, such as a "stop" or "go" user gesture).

When the electronic controller 220 determines that the user gesture is in a first direction towards one of the plurality of autonomous vehicles 111 and/or in a same direction as a front of the visual notification device 117 (e.g. a "YES" decision at the block 406), at the block 408 the electronic controller 220 controls the visual notification device 117 to provide a visual indication of the user gesture combined with the authentication data 259 to visually instruct the autonomous vehicle (e.g. the autonomous vehicle 111 and/or an autonomous vehicle 111 in the direction of the user gesture) to perform an action associated with the user gesture upon verification and/or validation and/or authentication of the authentication data 259.

For example, when the authentication data 259 comprises a key associated with the user 115, the electronic controller 220 may be further configured to provide the visual indication of the user gesture combined with the authentication data by: validating and/or authorizing and/or signing and/or encrypting, using the key, the unvalidated visual notification data 261 representing an unvalidated and/or unauthorized and/or unsigned and/or unencrypted version of the visual indication, the visual indication generated from the unvalidated visual notification data 261 validated and/or authorized and/or signed and/or encrypted using the key. For example, the unvalidated visual notification data 261 may comprise alphanumeric data representative of a pattern that may be provide by the visual notification device 117, and the alphanumeric data may be encrypted using the authentication data 259 to produce encrypted alphanumeric data that may also be provided by the visual notification device 117.

Hence, for example, the visual indication of the unvalidated version of the visual indication may comprise an unencrypted version of the unvalidated version of the visual indication; a user of skill in the art understands that the unvalidated version of the visual indication may comprise a pattern of lights and/or colors specifically for instructing an autonomous vehicle to perform a respective action, while the encrypted version of the unvalidated version of the visual indication comprises a pattern of lights and/or colors that may be received by an autonomous vehicle 111 and unencrypted and/or decoded using the key 129 to determine the unvalidated version of the visual indication.

Alternatively, and/or in addition, the electronic controller 220 may be further configured to control the visual notification device 117 to provide the visual indication of the user gesture combined with the authentication data by: controlling the visual notification device to provide a respective visual indication of the authentication data 259 before or after controlling the visual notification device 117 to provide the visual indication of the user gesture. For example, the electronic controller 220 may provide a pattern of lights and/or colors representing the unvalidated version of the visual indication (e.g. using unvalidated visual notification data 261) and prepend and/or append a pattern of lights and/or colors representing the identifier 169 thereto which enables an autonomous vehicle 111 to retrieve the key 129 from the server 113.

Alternatively, in some examples, the electronic controller 220 may control the visual notification device 117 to provide a pattern of lights and/or colors representing the unvalidated version of the visual indication (e.g. using unvalidated visual notification data 261) and prepend and/or append a pattern of lights and/or colors representing the authentication data 259 thereto.

Returning to the block 406, when the electronic controller 220 determines that the user gesture is not towards one of the plurality of autonomous vehicles 111 and/or not in a same direction as the front of the visual notification device 117 (e.g. a "NO" decision at the block 406), at the block 410 the electronic controller 220 prevents the visual notification device 117 from providing a visual indication of the user gesture.

However, in some examples, the block 404, the block 406 and the block 410 are optional and the visual notification device 117 may be controlled to provide a visual indication of the user gesture combined with the authentication data 259 without determining a direction of a user gesture and/or regardless of a direction of a user gesture.

After (and/or while) the visual notification device 117 is controlled to either provide (e.g. at the block 408) the visual indication of the user or prevent (e.g. at the block 410) the visual indication of the user, at a block 412, the electronic controller 220 continues to determine whether a new user gesture is detected. The determination of whether a new user gesture is detected is similar to as described above with respect to the block 402. When a new user gesture is detected (a "YES" decision at the block 412), the electronic controller 220 again implements the blocks 404, 406 and one of the blocks 408, 410, and may again repeat the block 412. Otherwise, when a new user gesture is not detected (a "NO" decision at the block 412), the electronic controller 220 may repeat the block 412 until a new user gesture is detected.

Figure 5:
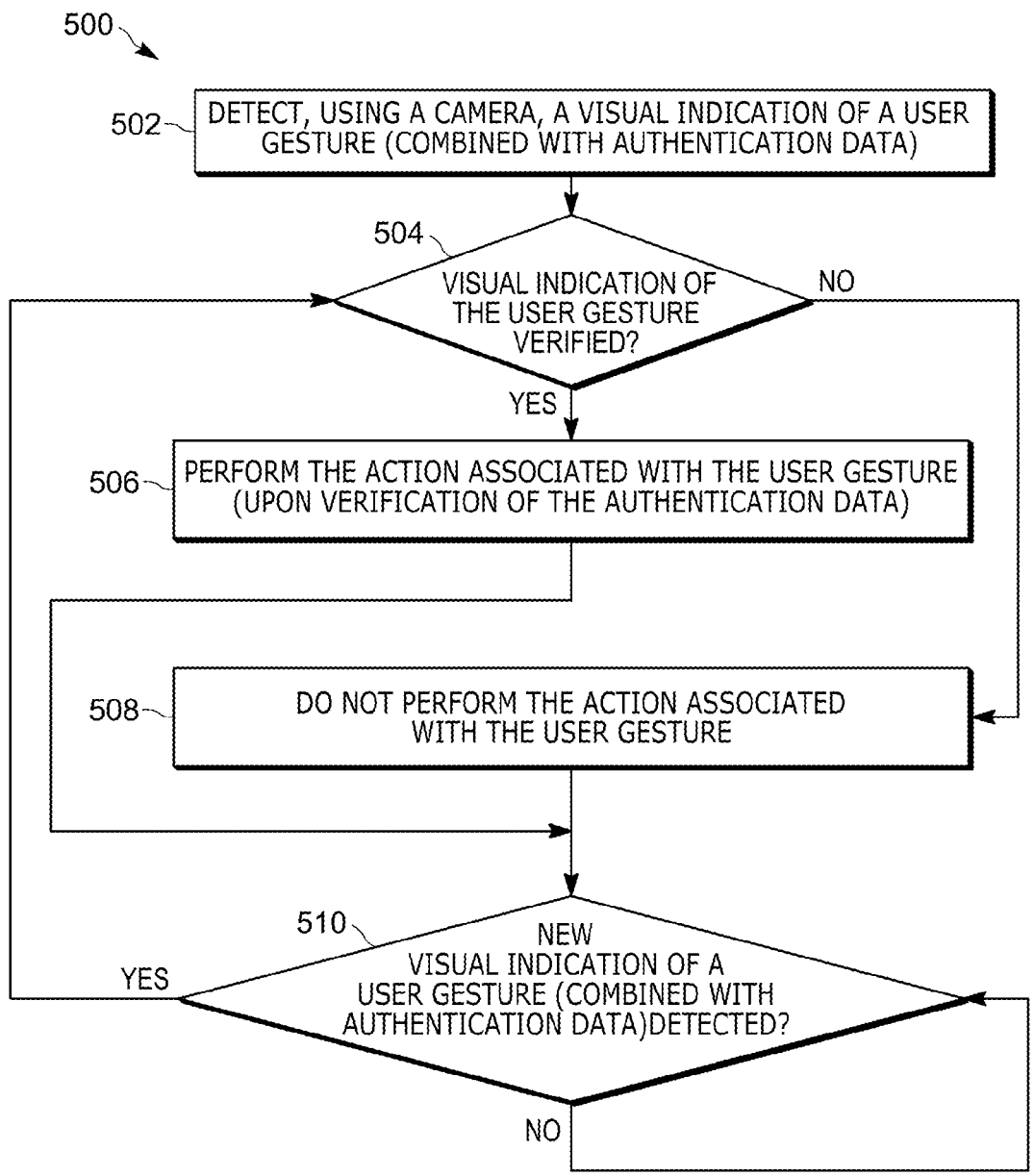
FIG. 5 depicts a flowchart of a method for receiving visual signals from a visual notification device, in accordance with some embodiments.

Attention is now directed to FIG. 5 which depicts a flowchart representative of a method 500 for receiving visual signals from a visual notification device at an autonomous vehicle. The operations of the method 500 of FIG. 5 correspond to machine readable instructions that are executed by, for example, the computing device 301 of one or more of the autonomous vehicles 111, and specifically by the electronic controller 320 of the computing device 301. In the illustrated example, the instructions represented by the blocks of FIG. 5 are stored at the memory 322 for example, as the application 323. The method 500 of FIG. 5 is one way in which the electronic controller 320 and/or the computing device 301 and/or the autonomous vehicles 111 and/or the system 100 is configured. Furthermore, the following discussion of the method 500 of FIG. 5 will lead to a further understanding of the computing device 301 and/or the autonomous vehicles 111 and/or the system 100, and its various components. However, it is to be understood that the method 500 and/or the computing device 301 and/or the autonomous vehicles 111 and/or the system 100 may be varied, and need not work exactly as discussed herein in conjunction with each other, and that such variations are within the scope of present examples.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the computing device 301 and/or the autonomous vehicles 111 and/or the system 100 of FIG. 1, as well.

Furthermore, while it is understood by a person of skill in the art hereafter that the method 500 is performed at the computing device 301, the method 500 may be performed at one or more of the devices of the system 100, for example at a combination of the computing device 301 and a cloud-computing device, such as the server 113.

At a block 502, the electronic controller 320 detects, using the camera 121, a visual indication of the user gesture which may be (or may not be) combined with the authentication data 259. For example, the camera 121 facing the visual notification device 117 acquires one or more images and/or video of a pattern being provided by the visual notification device 117.

At a block 504, the electronic controller 320 determines whether the visual indication of the user gesture is verified and/or validated and/or authenticated.

For example, as described above, the visual indication may be generated from the data 261 representing an unvalidated version of the visual indication, the data 261 being signed using a key to produce the visual indication. The electronic controller 320 may be further configured to verify and/or validate and/or authenticate the visual indication of the user gesture by: receiving, from the memory 128 (and/or the memory 322), the key 129; determining, using the key 129, the unvalidated version of the visual indication; comparing the unvalidated version of the visual indication with a plurality of unvalidated versions of visual indications (e.g. the data 361); and when a match occurs, verifying and/or validating and/or authenticating the visual indication. Such a match may indicate a successful verification (e.g. a "YES" decision at the block 504). However, when no match occurs, the visual indication may be not verified and/or not validated and/or not authenticated (e.g. a "NO" decision at the block 504).

Furthermore, when the memory 128 storing the key 129 is located at a cloud-based device, such as the server 113, the electronic controller 320 may be further configured to receive, from the memory 128, the key 129 by one or more of retrieving the key 129 from the memory 128 prior to detecting the visual indication; retrieving the key 129 from the memory 128 based on a location of the autonomous vehicle; and detecting, using the camera 121, with the visual indication, a respective visual indication of the authentication data 259, the respective visual indication of the authentication data 259 used to retrieve the key from the memory 128.

For example, an autonomous vehicle 111 may register with the server 113 prior to approaching the intersection 116 and, upon registration, receive the key 129 for storage at a respective memory 322 (e.g. as depicted in FIG. 3). In such a registration, the autonomous vehicle 111 may further receive the unvalidated visual notification data 361.

Alternatively, the electronic controller 320 may determine a current location of a respective autonomous vehicle 111 using the location determining device 337 and transmit the current location to the server 113. The server 113 may compare the current location with the location 170 and, when the current location is within a given distance of the location 170 (e.g. the given distance defined using geofence techniques), the server 113 may transmit the key 129 to the electronic controller 320 (e.g. to a respective autonomous vehicle 111).

Alternatively, when a respective visual indication of the authentication data 259 is provided by the visual notification device 117, such as the identifier 169, the respective visual indication may be used by the electronic controller 320 to retrieve the key 129 from the server 113.

Alternatively, the respective visual indication of the authentication data 259 may include a visual indication of the authentication data 259 (e.g. a key translated and/or converted into a pattern provide by the visual notification device 117).

Hence, in general, the electronic controller 320 may be configured to translate the respective visual indication to alphanumeric data and the like indicative of the identifier 169 and/or the authentication data 259.

When a successful verification, and the like, occurs at the block 504 (e.g. a "YES" decision at the block 504), at a block 506, the electronic controller 320 performs an action associated with the user gesture (e.g. upon verification of the authentication data 259), for example by retrieving associated action data 370 and controlling the autonomous vehicle components 335 using the action data 370.

However, when a successful verification does not occur at the block 504 (e.g. a "NO" decision at the block 504), at a block 508, the electronic controller 320 does not perform an action associated with the user gesture.

After (and/or while) the action associated with the user gesture is being performed (e.g. at the block 506) or not performed (e.g. at the block 508), at a block 510, the electronic controller 320 continues to determine whether a new visual indication of a user gesture is detected. The determination of whether a new visual indication of a user gesture is detected is similar to as described above with respect to the block 503. When a new visual indication of a user gesture is detected (a "YES" decision at the block 510), the electronic controller 320 again implements the block 504 and one of the blocks 506, 508, and may again repeat the block 510. Otherwise, when a new visual indication of a user gesture is detected is not detected (a "NO" decision at the block 510), the electronic controller 320 may repeat the block 510 until a new visual indication of a user gesture is detected.

Figure 6:
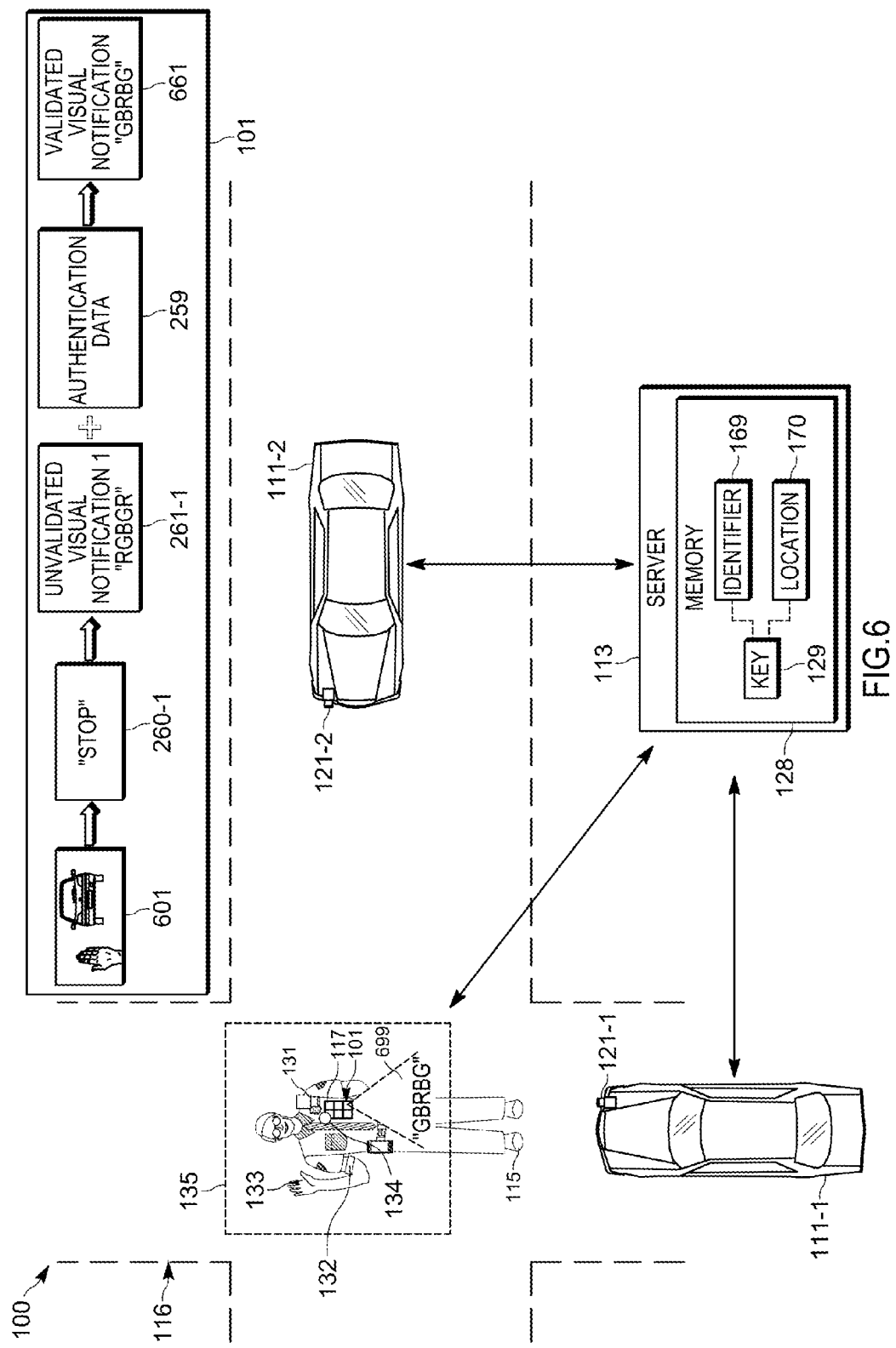
FIG. 6 depicts the visual notification device of the system of FIG. 1 providing a validated visual indication of a user gesture in accordance with some embodiments.
Figure 7:
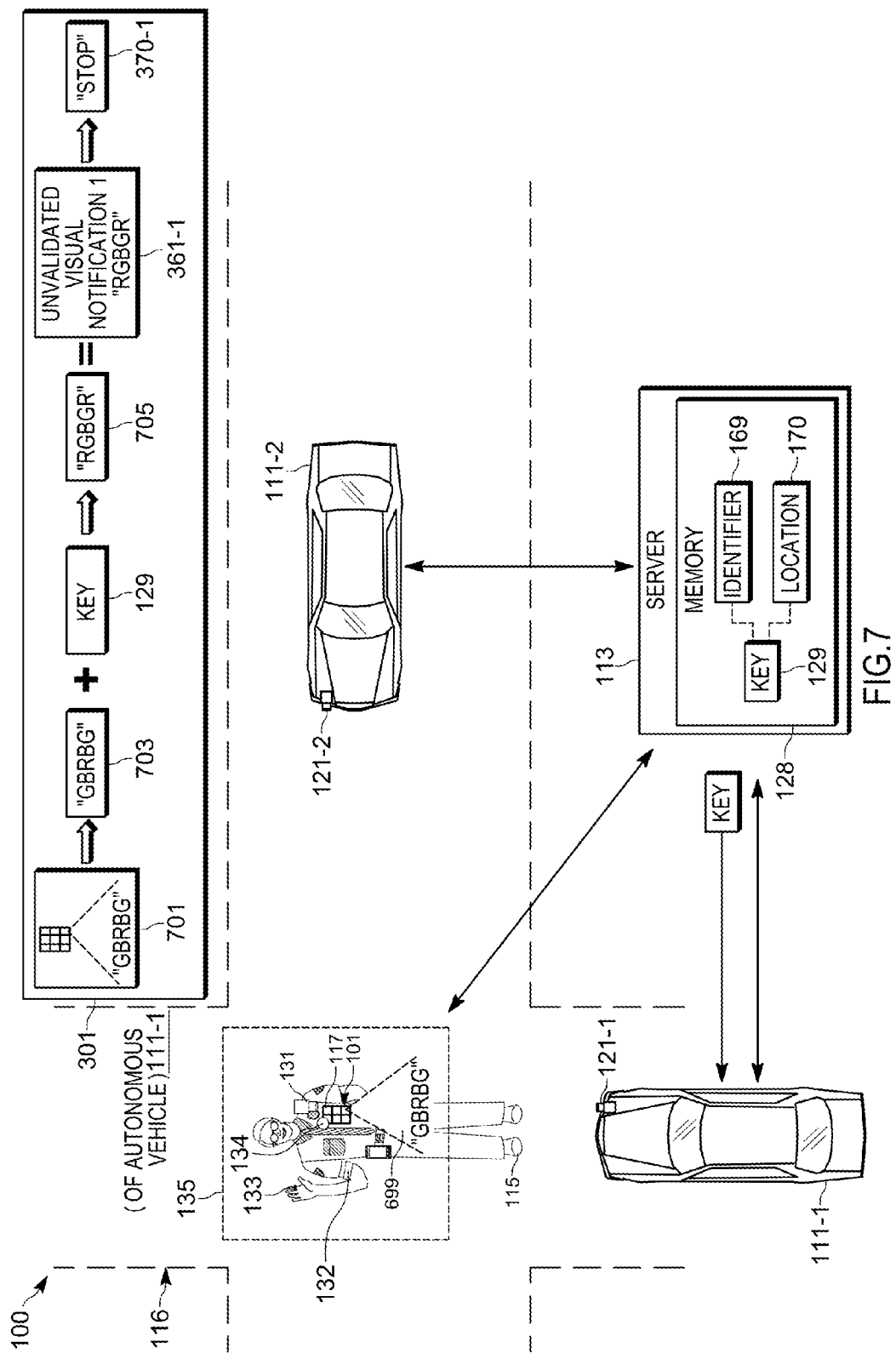
FIG. 7 depicts an autonomous vehicle of the system of FIG. 1 detecting the validated visual indication of the user action and implementing an associated action in accordance with some embodiments.
Figure 8:
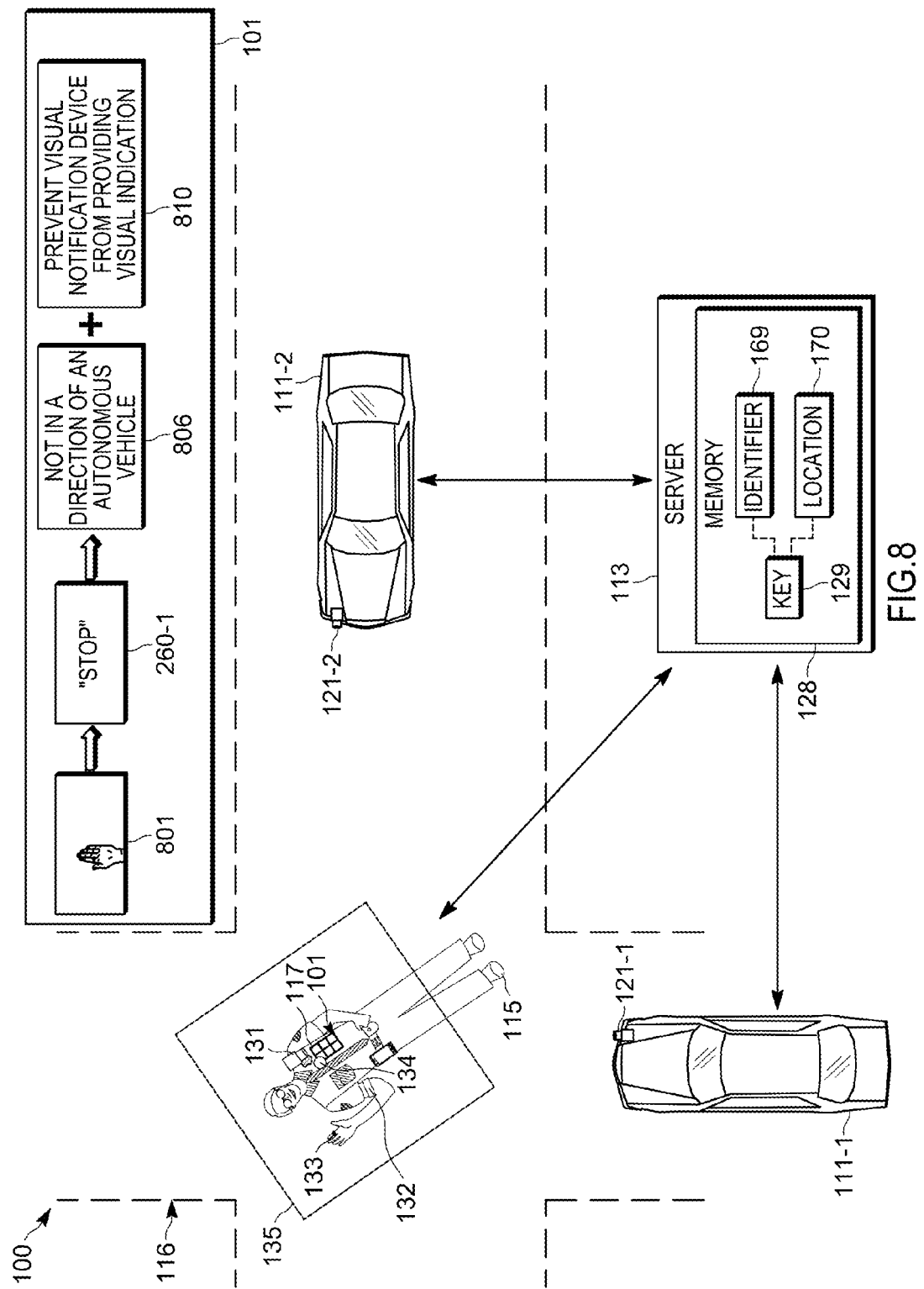
FIG. 8 depicts the visual notification device of the system of FIG. 1 being preventing from providing a visual indication of a user gesture in accordance with some embodiments.

Attention is next directed to FIG. 6 to FIG. 8, which depicts an example of the method 400 and the method 500. Each of FIG. 6 to FIG. 8 is substantially similar to FIG. 1, with like components having like numbers.

Attention is next directed to FIG. 6 which depicts the user 115 performing a "Stop" gesture with the hand and arm that is also wearing the armband 132 and the ring 133, the "Stop" gesture being in a direction of the first autonomous vehicle 111-1 and in a same direction as a front of the visual notification device 117. For example, the user 115 may be holding their hand in a direction out in front of themselves, toward the first autonomous vehicle 111-1. However, the user 115 may be holding their hand at an angle, for example, at a right angle to their body with hand performing the "Stop" gesture facing the first autonomous vehicle 111-1.

Also depicted in FIG. 6, in the upper right, is a schematic depiction of the device 101. As depicted, the device 101 has detected movement data 601 indicative of the "Stop" user gesture. As depicted, the movement data 601 includes an image and/or video of the hand of the user 115 performing the "Stop" user gesture, for example as acquired by one or more of the cameras 131, 134. However, the movement data 601 may include data from one or more of armband 132 and the ring 133. As also depicted, the device 101 may further compare the movement data 601 to the gesture data 260 to determine (e.g. at the block 402 of the method 400) that the movement data 601 is indicative of a "Stop" user gesture associated with the gesture data 260-1.

The image and/or video of the movement data 601 further shows a front of the first autonomous vehicle 111-1 and hence the device 101 may further determine (e.g. at the block 404 of the method 400), that the direction of the "Stop" user gesture is towards the first autonomous vehicle 111-1 and/or away from a front of the visual notification device 117. Hence, a "YES" decision occurs at the block 406 of the method 400.

As depicted, as the device 101 has identified the "Stop" user gesture, the device 101 combines the unvalidated visual notification data 261-1, associated with the "Stop" user gesture, with the authentication data 259, for example to produce validated visual notification data 661 which indicates a visual indication of the "Stop" user gesture combined with the authentication data 259. For example, the validated visual notification data 661 comprises pattern of colors in a sequence "Green-Blue-Red-Blue-Green" which indicates an encrypted version of the unvalidated visual notification data 261-1 pattern of colors in the sequence "Red-Green-Blue-Green-Red". When the unvalidated visual notification data 261 comprises numbers representing a color pattern, and the like, the validated visual notification data 661 may also comprises numbers representing a color pattern, and the like, the validated visual notification data 661 used to control the visual notification device 117 to provide the respective color pattern.

The validated visual notification data 661 may be generated in a manner which ensure that the validated visual notification data 661 is not similar to any unvalidated visual notification data 261; for example, the unvalidated visual notification data 261 may include one or more colors that are different from the colors of unvalidated visual notification data 261 (e.g. cyan and/or yellow and/or magenta may be used in place of red and/or green and/or blue) and/or sequences of colors of the unvalidated visual notification data 261 may be of a different length of sequences of colors of the unvalidated visual notification data 261, and the like.

As also depicted in FIG. 6, the visual notification device 117 is controlled (e.g. at the block 408 of the method 400) to provide the validated visual notification data 661 by providing a visual indication 699 of colors in the sequence "Green-Blue-Red-Blue-Green". The validated visual notification data 661 may be provided as the visual indication 699 in a period of time compatible with instructing the first autonomous vehicle 111-1 to stop and/or a time compatible with the cameras 121, for example less than 1 second.

While FIG. 6 depicts the visual notification device 117 being controlled to provide the validated visual notification data 661, the visual notification device 117 may be alternatively controlled to provide a respective visual notification of the identifier 169 and/or visual notification device 117 may be alternatively controlled to provide a respective visual notification of the authentication data 259.

Furthermore, the device 101 may then implement the block 412 to repeat the method 400 when a new user gesture is detected.

Attention is next directed to FIG. 7 which depicts, in the upper right, a schematic depiction of the computing device 301 of the first autonomous vehicle 111-1 detecting (e.g. at the block 502 of the method 500), using the camera 121-1, one or more of images and/or video 701 of a visual indication of the "Stop" user gesture combined with the authentication data 259. In particular, the one or more images and/or video 701 includes images of the visual notification device 117 providing the pattern of colors in the sequence "Red-Green-Blue-Green-Red".

The computing device 301 uses the key 129 to decode the visual indication of the "Stop" user gesture combined with the authentication data 259.

As depicted, the first autonomous vehicle 111-1 may receive the key 129 from the server 113 via a respective communication link therebetween, either upon request and/or according to a location of the first autonomous vehicle 111-1. Alternatively, while not depicted, the one or more images and/or video 701 may include images, and the like, of the visual notification device 117 providing the pattern of colors in the sequence "Red-Green-Blue-Green-Red" may include a visual notification of the identifier 169 which may be used to retrieve the key 129. Alternatively, when the visual notification device 117 is controlled to provide a respective visual notification of the authentication data 259 (e.g. the authentication data 259 comprises a symmetric key corresponding to the key 129), the key 129 may be received in the respective visual notification of the authentication data 259.

Regardless of how the computing device 301 of the first autonomous vehicle 111-1 obtains the key 129, as depicted, the computing device 301 uses the key 129 to verify (e.g. at the block 504 of the method 500) the "Stop" user gesture, for example by converting the sequence of colors detected in the one or more images and/or video 701 to alphanumeric text 703 corresponding to "GBRBG" and/or numbers representing the sequence of colors detected in the one or more images and/or video 701.

The key 129 is used to decode the alphanumeric text 703 to determine an unvalidated version 705 of the visual indication detected in the one or more images and/or video 701; for example, the unvalidated version 705 comprises alphanumeric text "RGBGR" that corresponds to a sequence of colors (and/or the unvalidated version 705 may be represented numerically).

The unvalidated version 705 is compared to the unvalidated visual notification data 361 stored in the memory 322 and a match is determined (e.g. a "YES" decision at the block 504) with the unvalidated visual notification data 361-1. Such a match both verifies the "Stop" user gesture and determines a set of action data 370-1 that is to be performed by the autonomous vehicle components 335 of the first autonomous vehicle 111-1 to "Stop" and/or perform the action indicated by the user gesture (e.g. at the block 506 of the method 500). The first autonomous vehicle 111-1 may then continue to determine (e.g. at the block 510) whether a new visual indication of a user gesture is detected, which may or may not be combined with authentication data.

However, when no match occurs (e.g. a "NO" decision at the block 504), the computing device 301 may determine that the user gesture is not verified and hence may not implement the action corresponding to the user gesture (e.g. at the block 508 of the method 500). For example, the user 115 may not be authorized to direct traffic, but rather a malicious user attempting to disrupt traffic and a visual notification of the user gesture provided by the visual notification device 117 may either not be signed and/or signed with authentication data that is not compatible with the key 129. Hence, a verification failure may occur at the computing device 301 when either the visual notification of the user gesture provided by the visual notification device 117 is not signed and/or signed with authentication data not compatible with the key 129.

When the user gesture is not verified, the autonomous vehicle components 335 of the first autonomous vehicle 111-1 are generally controlled according "normal" operations autonomous navigation, for example to stop and/or slow down at the intersection 116 and/or to avoid the user 115 and/or avoid other vehicles that may be in the intersection 116 (such as the second autonomous vehicle 111-2).

The first autonomous vehicle 111-1 may then continue to determine (e.g. at the block 510) whether a new visual indication of a user gesture is detected, which may or may not be combined with authentication data.

While not depicted, once the user 115 stops the first autonomous vehicle 111-1, the user 115 may turn to the second autonomous vehicle 111-2 and, using a wave gesture and/or a "Go" user gesture, wave the second autonomous vehicle 111-2 through the intersection; in these examples, the device 101 may determine, using the gesture data 260-2, that the visual notification device 117 is to be controlled using the unvalidated visual notification data 261-1, which is signed accordingly with the authentication data 259. The second autonomous vehicle 111-2 may detect the validated visual notification of the "Go" user gesture, decode it using the key 129, and determine that the "Go" action corresponding to the action data 370-2 is to be implemented.

Alternatively, the user 115 may also perform a "Stop" user gesture to stop the second autonomous vehicle 111-2.

However, attention is next directed to FIG. 8 which depicts the user 115 attempting to stop the second autonomous vehicle 111-2 without turning towards the second autonomous vehicle 111-2. For example, as depicted, the user 115 is performing the "Stop" user gesture in a direction that excludes either of the autonomous vehicles 111. FIG. 8 also depicts, in the upper right, a schematic depiction of the device 101 detecting movement data 801 including images indicative of the "Stop" user gesture, similar to the movement data 601. However, images of the movement data 801 do not include an image of either of the autonomous vehicles 111. While the device 101 may determine that the user gesture of the movement data 801 corresponds to the gesture data 260-1, device 101 may also determine 806 that the user gesture is not in a direction of an autonomous vehicle (e.g. at the block 406 of the method 400) and hence prevents 810 the visual notification device 117 from providing a visual indication (e.g. at the block 410 of the method 400). For example, in FIG. 8, the visual notification device 117 is not providing a visual indication. Furthermore, the device 101 may then implement the block 412 to repeat the method 400 when a new user gesture is detected.

A similar prevention may occur, for example, when the user gesture is not in a direction away from a front of the visual notification device 117, for example when the user 115 extends their arm out to the right such that their hand and/or their arm is not in a view of the cameras 131, 134; however, in these examples, data from one or more of the armband 132 and the ring 133, when present, may be used to determine that a user gesture is towards an autonomous vehicle 111.

Hence, provided herein is a device, system and method for controlling autonomous vehicles using a visual notification device in which the user gestures are detected using a movement detector and translated and/or converted to a visual indication. The visual authentication data is combined with authentication data, for example by signing and/or validating and/or authenticating and/or encrypting the visual authentication data with a key. The validated visual authentication data is provided by the visual notification device. In some examples, the validated visual authentication data is provided by the visual notification device only when in a direction of an autonomous vehicle and/or in a direction away from a front of the visual notification device. The validated visual authentication data may be provided as a pattern, which is detected by a camera of an autonomous vehicle. The autonomous vehicle verifies the user gesture associated with the validated visual authentication data, for example by obtaining a key that decodes the validated visual authentication data. When the validated visual authentication data is successfully decoded, the autonomous vehicle performs an associated action.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A device for visually communicating with an autonomous vehicle, the device comprising:
   a visual notification device comprising one or more of: a display screen; a color display screen; one or more light emitting diodes; and a light emitting diode array;

a memory storing authentication data; and
a controller in communication with a movement detector, the controller communicatively coupled to the visual notification device and the memory,
the controller configured to:
  detect, using the movement detector, a user gesture of a user; and
  control the visual notification device to provide a visual indication of the user gesture combined with the authentication data to visually instruct the autonomous vehicle to perform an action associated with the user gesture upon verification of the authentication data,
  wherein the visual indication of the user gesture combined with the authentication data comprises one or more of: one or more flashing colors; one or more colored visual indications; and one or more red-green-blue visual indications.

2. The device of claim 1, further comprising a housing wearable by the user.

3. The device of claim 1, wherein the controller is further configured to:
  determine a direction of the user gesture; and
  control the visual notification device to provide the visual indication of the user gesture combined with the authentication data when the direction of the user gesture is one or more of:
  towards the autonomous vehicle; and away from a front of the visual notification device.

4. The device of claim 1, wherein the authentication data comprises one or more of:
  a key;
  a security key;
  a cryptographic key;
  data for retrieving the key from a repository;
  a first private key associated with the user; and
  a second private key associated with an entity of the user.

5. The device of claim 1, wherein the authentication data comprises a key associated with the user, and the controller is further configured to provide the visual indication of the user gesture combined with the authentication data by:
  validating, using the key, data representing an unvalidated version of the visual indication, the visual indication generated from the data validated using the key.

6. The device of claim 1, wherein the controller is further configured to control the visual notification device to provide the visual indication of the user gesture combined with the authentication data by:
  controlling the visual notification device to provide a respective visual indication of the authentication data before or after controlling the visual notification device to provide the visual indication of the user gesture.

7. The device of claim 1, wherein the movement detector comprises one or more of:
  a wearable device worn by the user;
  an armband worn by the user;
  a ring worn by the user;
  a first camera worn by the user;
  an integrated movement detector integrated with a housing; and
  a second camera integrated with the housing.

8. A method for visually communicating with an autonomous vehicle, the method comprising:
  detecting, using a movement detector, a user gesture of a user; and
  controlling, using a controller in communication with the movement detector, a visual notification device to provide a visual indication of the user gesture combined with authentication data stored at a memory, to visually instruct the autonomous vehicle to perform an action associated with the user gesture upon verification of the authentication data,
  wherein the visual notification device comprises one or more of: a display screen; a color display screen; one or more light emitting diodes; and a light emitting diode array, and
  wherein the visual indication of the user gesture combined with the authentication data comprises one or more of: one or more flashing colors; one or more colored visual indications; and one or more red-green-blue visual indications.

9. The method of claim 8, further comprising:
  determining, at the controller, a direction of the user gesture; and
  controlling, using the controller, the visual notification device to provide the visual indication of the user gesture combined with the authentication data when the direction of the user gesture is one or more of: towards the autonomous vehicle; and away from a front of the visual notification device.

10. The method of claim 8, wherein the authentication data comprises one or more of:
  a key;
  a security key;
  a cryptographic key;
  data for retrieving the key from a repository;
  a first private key associated with the user; and
  a second private key associated with an entity of the user.

11. The method of claim 8, wherein the authentication data comprises a key associated with the user, and the method further comprises:
  providing the visual indication of the user gesture combined with the authentication data by:
  validating, using the key, data representing an unvalidated version of the visual indication, the visual indication generated from the data validated using the key.

12. The method of claim 8, further comprising controlling the visual notification device to provide the visual indication of the user gesture combined with the authentication data by:
  controlling the visual notification device to provide a respective visual indication of the authentication data before or after controlling the visual notification device to provide the visual indication of the user gesture.

13. A system comprising:
  an autonomous vehicle comprising a camera; and
  a device for visually communicating with the autonomous vehicle, the device comprising: a visual notification device comprising one or more of: a display screen; a color display screen; one or more light emitting diodes; and a light emitting diode array; a memory storing authentication data; and a controller in communication with a movement detector, the controller communicatively coupled to the visual notification device and the memory, the controller configured to:
  detect, using the movement detector, a user gesture of a user; and
  control the visual notification device to provide a visual indication of the user gesture combined with the authentication data to visually instruct the autonomous vehicle to perform an action associated with the user gesture upon verification of the authentication data,
  wherein the visual indication of the user gesture combined with the authentication data comprises one or more of: one or more flashing colors; one or more colored visual indications; and one or more red-green-blue visual indications, and the autonomous vehicle configured to:
   detect, using the camera, the visual indication of the user gesture combined with the authentication data;
   verify the visual indication of the user gesture; and
   perform the action associated with the user gesture upon verification of the authentication data.

14. The system of claim 13, further comprising a plurality of autonomous vehicles, including the autonomous vehicle, wherein the controller is further configured to:
   determine a direction of the user gesture;
   when the direction of the user gesture is in a first direction is one or more of: towards one of the plurality of autonomous vehicles; and in a same direction as a front of the visual notification device:
      control the visual notification device to provide the visual indication of the user gesture combined with the authentication data; and
   when the user gesture is in a second direction that one or more of: excludes any of the plurality of autonomous vehicles; and is not in the same direction as the front of the visual notification device:
      prevent the visual notification device from providing the visual indication of the user.

15. The system of claim 13, wherein the visual indication is generated from data representing an unvalidated version of the visual indication, the data validated using a key, and the autonomous vehicle is further configured to verify the visual indication of the user gesture by:
   receiving, from a memory, a key;
   determining, using the key, the unvalidated version of the visual indication;
   comparing the unvalidated version of the visual indication with a plurality of unvalidated versions of visual indications; and
   when a match occurs, verifying the visual indication.

16. The system of claim 15, wherein the memory is located at a cloud-based device, and the autonomous vehicle is further configured to receive, from the memory, the key by one or more of:
   retrieving the key from the memory prior to detecting the visual indication;
   retrieving the key from the memory based on a location of the autonomous vehicle; and
   detecting, using the camera, with the visual indication, a respective visual indication of the authentication data, the respective visual indication of the authentication data used to retrieve the key from the memory.

* * * * *